United States Patent [19]

Simpson et al.

[11] Patent Number: 4,897,356
[45] Date of Patent: Jan. 30, 1990

[54] ROTATING COILED TUBE BIOLOGICAL CONTACTOR

[75] Inventors: James R. Simpson; Winifred B. Simpson, both of Northumberland County, United Kingdom

[73] Assignee: Solids Dewatering Systems, Inc., St. Louis, Mo.

[21] Appl. No.: 318,726

[22] Filed: Mar. 3, 1989

[51] Int. Cl.$^4$ ............................................. D06M 16/00
[52] U.S. Cl. ...................................... 435/262; 435/312; 210/619
[58] Field of Search ............... 435/287, 312, 262, 264; 210/619, 150, 151

[56] References Cited

U.S. PATENT DOCUMENTS 4,676,892 6/1987 Grabowski ........................... 210/619

Primary Examiner—Carroll B. Dority
Attorney, Agent, or Firm—Gravely, Lieder & Woodruff

[57] ABSTRACT

This device brings microorganisms into contact with liquids as required, for example, in the treatment of sewage. The device comprises a hollow main shaft into which the inner ends of coiled process elements or process tubes are inserted and fixed. Each tube is coiled in increasing diameters at right angles around the shaft. The shaft is placed in a tank partially immersing the tubes such that when the shaft rotates the open end of each tube, into which liquid enters, alternatively passes through the liquid and the surrounding atmosphere, then the liquid, and so on. Liquid picked up during previous revolutions rotates through the tubes and eventually discharges into and through the hollow main shaft to a receiving wheel. In this way, discrete volumes of liquid pass sequentially through the tubes and are brought in contact with the microorganisms on the inner surface of the tubes.

15 Claims, 3 Drawing Sheets

FIG. 8.
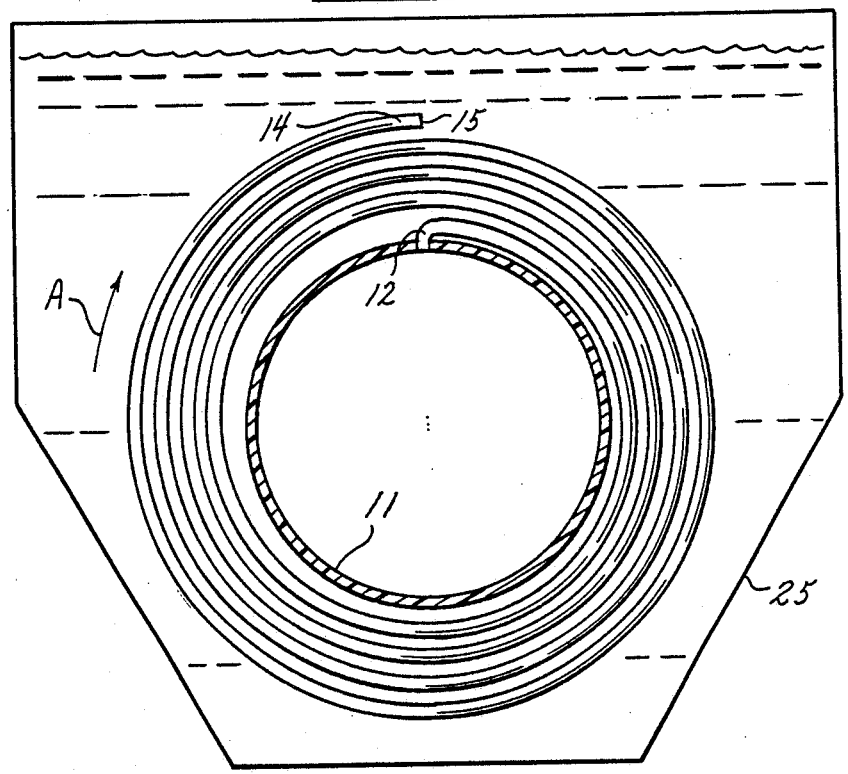
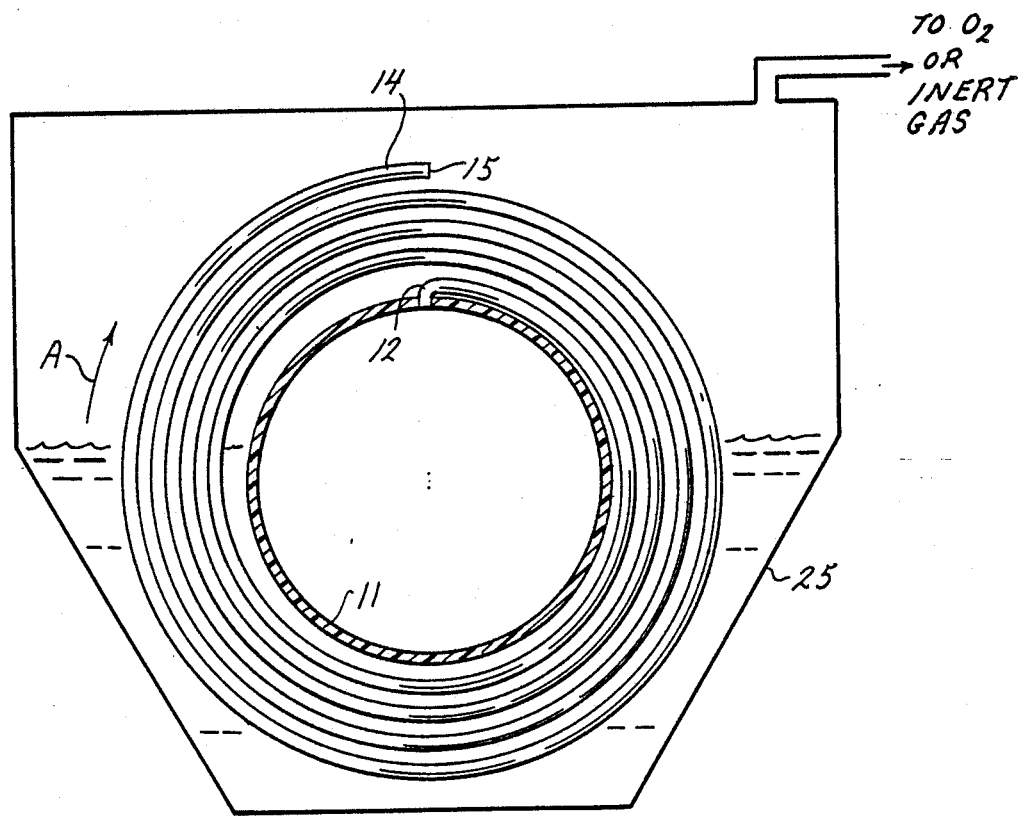
FIG. 7.

ROTATING COILED TUBE BIOLOGICAL CONTACTOR

BACKGROUND OF THE INVENTION

This invention relates to microbiological reactions and, in particular, relates to a device and process for contacting microbiological growths with organic or inorganic substances under anaerobic or aerobic reaction conditions This invention is useful in bringing microbiological growths into contact with organic and/or inorganic substances, e.g., in industrial fermentation industries and in the treatment of sewage and industrial wastewaters. The invention is useful in the presence or absence of gaseous oxygen, depending on the nature of the microbiological reactions involved and the environment in which the invention is used.

A principal object of the present invention is to provide a process for treating a fluid material with microbiological growths by means an open-ended coiled tube which supports the microbiological growths internally and which rotates in a bath of the fluid material to pick up the fluid material and pass it to an internal channel for disposal.

Another object of the present invention is to provide a device for treating a fluid material with microbiological growths which has an elongated hollow center member with a series of connections through the outside wall and coiled tubes connected to the connections and surrounding the center member and open at their outer end for picking up the material to be treated. The microbiological growths are supported inside the tubes and contact the material to be treated as it passes through the tubes as the member and tubes are rotated in a bath of the material being treated.

These and other objects and advantages will become apparent hereinafter.

SUMMARY OF THE INVENTION

The invention comprises a process and device for contacting a fluid to be treated with microbiological growths in a rotating tube which has an open end that is passed through a bath of material to be treated and the microbiological growths are supported on the inside of the tube. The other end of the tube passes the treated fluid to a central collector for disposal.

The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 7 is a vertical sectional schemmatic view of a modified form of the invention in which oxygen or other gas inhabits the space about the fluid being traeated; and FIG. 8 is a vertical sectional schemmatic view of another modification of the invention in which the process is anaerobic.

DETAILED DESCRIPTION

The device 10 (FIGS. 1 and 2) comprises a supported hollow main shaft or collection chamber 11, hereafter known as the shaft, which may be of any material that will support the structural loads applied to it, and which will not deteriorate when exposed to water, microbiological growths and the products of microbiological reactions. The length, diameter, and wall thickness of the shaft is determined by the nature of the material of construction, and the volume and nature of the duties imposed on it. Preferably, the central chamber 11 is made of an inert polymeric material such as polypropylene, polyethylene, or the like.

Figure 6:
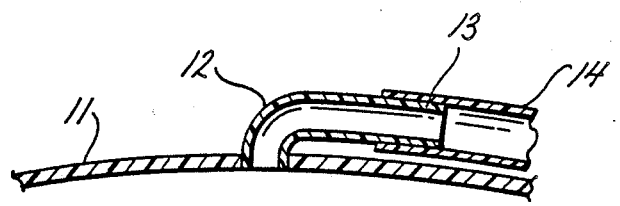
FIG. 6 is a fragmentary vertical sectional view of a connection of the tubing to the center member.
Figure 2:
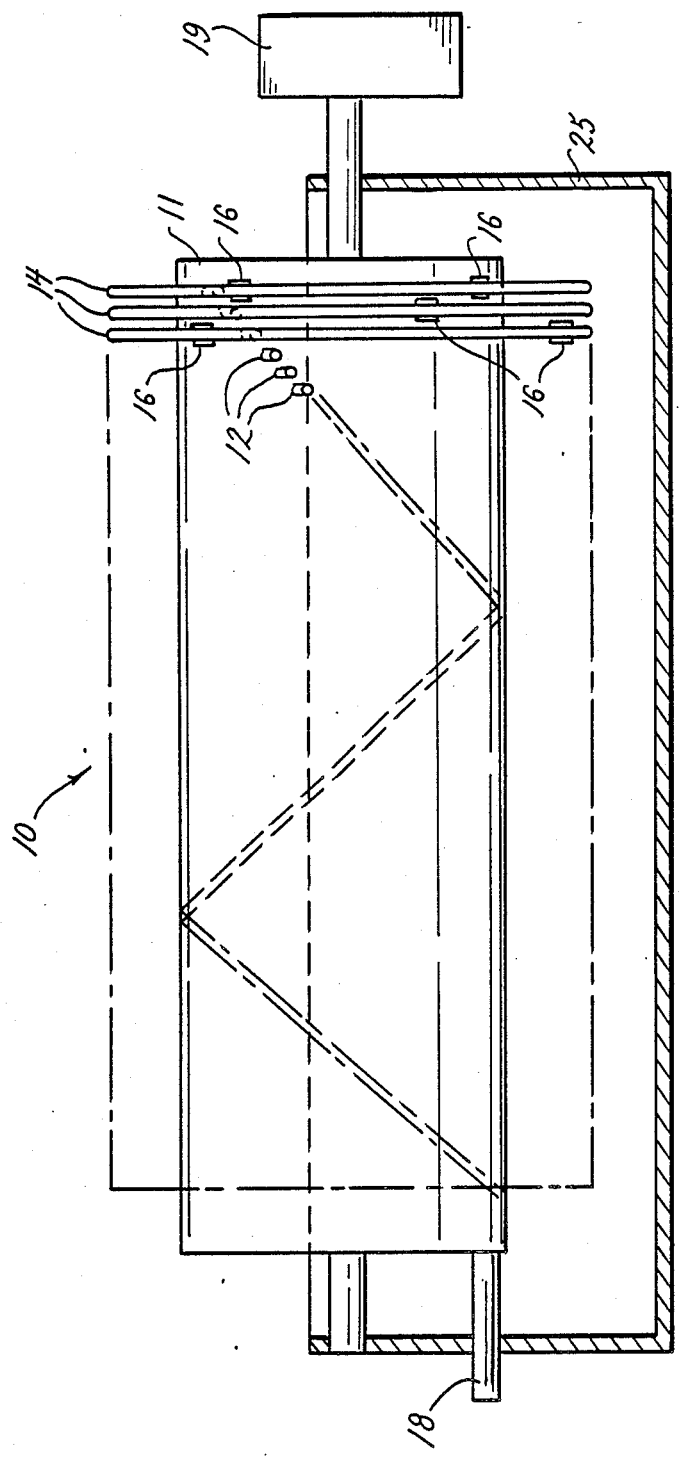
FIG. 2 is a longitudinal vertical sectional schemmatic view of the invention.

Along the length of the shaft 10 and passing through its outer shell to the inner wall are a series of hollow attachment tubes 12 secured such that the joints are waterproof and structurally sound (FIG. 6). The attachment tubes 12 are located along the length of the shaft 10 as required, but preferably they are close together and staggered around the circumference of the shaft 10 in a spiral formation (FIG. 2). The outer end 13 of each of the attachment tubes 12 is bent into alignment with the outside surface of the center chamber 11 and is long enough so that a process pipe or tube 14 may be secured thereto.

Figure 1:
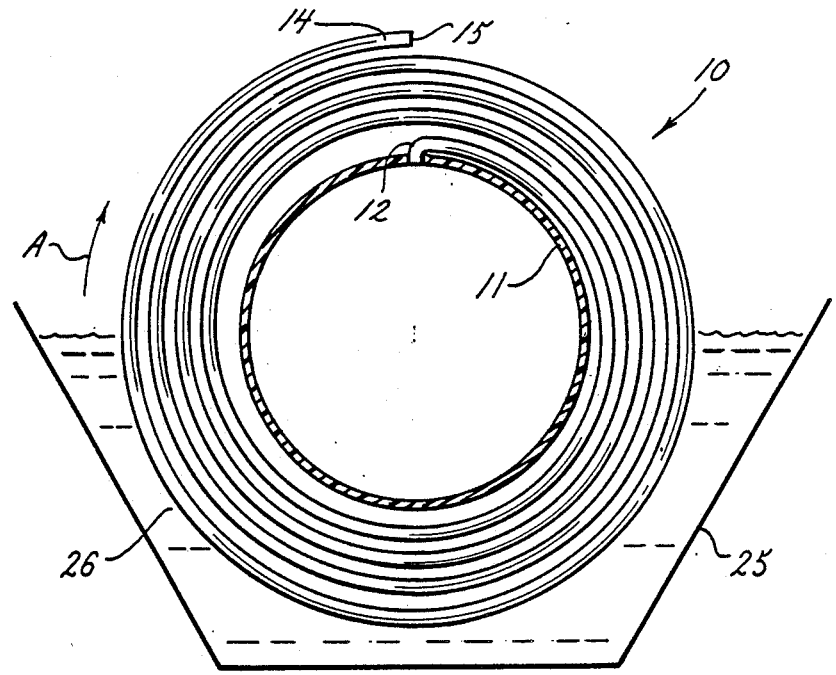
FIG. 1 is a transverse vertical sectional schemmatic view of the invention.

To the outer end 13 of each attachment tube 12 is connected and secured the pipe or tube 14, hereafter known as a process tube, which is coiled around itself in one plane in increasing diameters at right angles of the shaft 11 (FIG. 1). The material, diameter, and nature of the process tube 14 is determined by the requirements of the material being processed, but typically, it is made of a polymeric material that resists deterioration in the specific applied environment; it does not deteriorate in the presence of the substances to be processed or in the products of the particular microbiological reactions of the process. The coiled process tubes 14 are physically secured in the plane at right angles to the horizontal axis of the shaft 11 and along the length of the shaft 11. The securing means is indicated by the numerals 16 in FIG. 2 and can be brackets fixed to the outer surface of the shaft 11, fins on the shaft outer surface to define slots into which the process tubing 14 is wound and restrained, etc.

Figure 3:
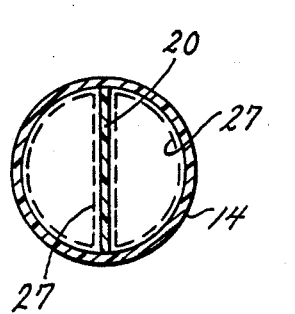
FIG. 3 is a vertical sectional view of a modified form of tubing.
Figure 4:
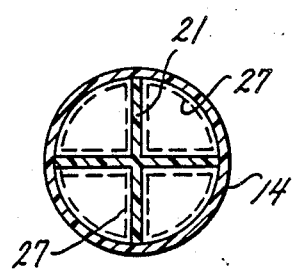
FIG. 4 is a vertical sectional view of a second modified form of tubing.
Figure 5:
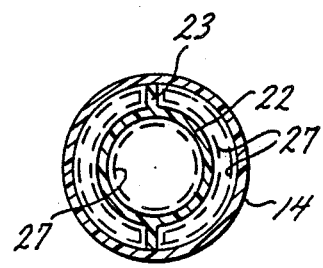
FIG. 5 is a vertical sectional view of a third modified form of tubing.

The total length of the sum of each of the lengths of the process tubes 14 is determined by the overall performance required of the device 10, the nature of the microorganisms present, the substances being processed, and the diameter, nature, and internal form of the tubes 14 used. The process tube 14 may be a simple tube in which microorganisms attach themselves to the inner wall of the tube, or the tube 14 may have in it and throughout its length inserted material which will increase the surface on which microorganisms will grow, but which will not unduly affect the flow of liquid through the tube. For example, FIGS. 3–5 show alternative inner tube constructions. FIG. 3 shows a simple single wall 20 across the inside diameter of the tube 14 and running throughout its length.

FIG. 4 shows a cross (+) shape 21 throughout the length of the process tube 14.

FIG. 5 shows a tube 22 of smaller diameter than the process tube 14 inserted throughout the length of each process tube 14 in order to increase the surface area on which microorganisms can grow. The smaller tube 22 is supported by members 23 and more than one smaller tube 22 can be positioned inside the main tube 14.

The process elements or tubes 14 can be of any suitable cross section, such as square, rectangular, eliptical, or the like. The process tubes can be extruded or an entire tube can be molded in halves, with the halves secured together. Also, the tubes can be molded in two sections with a third sheet interposed between the sections to form a double tube.

Referring to FIG. 1, the process tubes 14 fitted to the central shaft 11 are submerged along the horizontal axis in a tank 25, hereafter known as the processing tank, into which is introduced the liquid to be processed or treated 26. The depth of immersion may be partial or complete. Aerobic systems will require partial submergence in order that air may enter each process tube 14 when its open outer end 15 is out of the liquid. With anaerobic systems, complete immersion may be acceptable as shown in FIG. 8. The central shaft 11 is journaled in the end walls of the receptacle 25 and driven by suitable drive means 19. The shaft 11 rotates in the direction of the arrow "A" in FIG. 1 such that when the open ends 15 of the process tubes 14 enter the liquid some of the liquid enters the tubes 14. As the shaft 11 continues to rotate, the open ends 15 of the process tubes 14 will alternatively pass through the liquid and then out into the surrounding atmosphere, then into the liquid and so on. Liquid picked up during previous revolutions will be passed through the insides of the process tubes 14 and eventually discharge into the hollow main shaft 11 and thence to a settlement tank or collection vessel through a discharge 18 (FIG. 2).

As shown in FIG. 8, in anaerobic systems in which the process tubes 14 are completely immersed, liquid will enter the outer end 15 of each process tube 14 constantly as the shaft 11 rotates.

As the liquid passes through the process tubes 14, it will come into contact with microorganisms (shown in FIGS. 3-5 as number 27) attached to the inner surfaces of the tube 14 and on the surfaces of any inserts 20-23 in the tubes 14. Specific microorganisms may be introduced initially into the process tubes 14, or microorganisms may grow and develop naturally over a period of time if, for example, sewage is the liquid being processed.

The liquid to be processed should not contain solid particles which will physically block the process tubes 14. The processing tank 25 may also be designed to act as a primary settlement tank for crude settleable solids, with the inlet ends of the processing tubes being protected to prevent floating solids and scum from entering the tubes and blocking them, e.g., using suitably placed baffles.

Where aerobic microbiological reactions are required, the oxygen will be obtained from the air entrapped in the process tubes as they rotate through the air and then the liquid, and so on. Where greater amounts of gaseous oxygen are required, the device can be enclosed such that the rotating shaft passes through an enriched oxygen atmosphere. When anaerobic reactions are required, the device can be enclosed in a housing designed to exclude air, but which contains any other gas which may be considered appropriate or desirable. FIG. 7 shows such construction.

The discharge of treated liquid from the hollow shaft 11 will contain particulate, suspended microbiological growths which have grown on and then sloughed off the inner surfaces of the process tubes 14, or which have grown in the liquid as it passes through the tubes. If the device 10 is used for the treatment of sewage or industrial wastewaters, it will be necessary to remove some or most of these suspended solids, e.g., in a secondary settlement tank, before the waste is discharged to a receiving water, channel, or pipe. The nature and design of the settlement tank will be similar to one of those commonly used in the treatment of wastewaters.

The amount of liquid that can be processed will be affected by the:

(a) nature of the liquid to be processed;

(b) nature, internal diameter, type of insert if any, and the number and length of the process tubes;

(c) speed of rotation of the shaft onto which the process tubes are connected and secured;

(d) depth of immersion of the coiled tubes in the processing tank.

Depending on the design and layout of the processing tank, it may also perform as a balancing tank for any varying rates of flow of the liquid to be treated. The quantity of liquid passing through the coiled process tubes will be a function of the diameter of each tube, the depth of immersion and the speed of rotation. If the speed of rotation is kept constant, the rate of flow throughout the tubes will be affected by the diameter of each tube and the depth of immersion. This characteristic of the device renders it particularly suitable for the treatment of sewage or industrial wastewaters where the flow to be treated is variable.

This invention is intended to cover all changes and modifications of the example of the invention herein chosen for purposes of the disclosure which do not constitute departures from the spirit and scope of the invention.

We claim:

1. A method of treating a fluid with a microorganism comprising the steps if
   a. fixing a microorganism to the inner surface of a spiraled hollow process member having an open outer end and an inner end communicating with a central chamber which is sealed from contact with untreated fluid,
   b. at least partially submerging the process member and central chamber in the fluid to be treated,
   c. rotating the process member and central chamber in the fluid,
   d. causing the fluid to enter the open end of the process member,
   e. moving the fluid through the process member to contact the microorganism and be treated thereby, and
   f. discharging the treated fluid from the inner end of the process member into the central chamber.

2. The method of claim 1 including the step of flooding the atmosphere above the fluid with $O_2$.

3. The method of claim 1 including the step of flooding the atmosphere above the fluid with an inert gas.

4. The method of claim 1 wherein the process member and central chamber are completely submerged in the fluid to be treated.

5. A device for treating a fluid with a microorganism comprising:

a. an elongated central receiving chamber having an outer shell,
b. a series of longitudinally spaced ports in the chamber outer shell,
c. a longitudinal series of spirally wound process elements connected at one end to the ports and having open outer ends,
d. microorganisms fixed within the process elements,
e. a receptacle within which the receiving chamber is rotatably positioned and which retains the fluid to be treated, whereby the fluid level is such that the process elements are at least partially immersed in the fluid, and
f. means for rotating the chamber and process elements in the receptacle through the fluid whereby fluid moves through the process elements from the open ends to the ports into the chamber.

6. The device of claim 5 including additional support means inside the process elements for supporting microorganisms.

7. The device of claim 6 wherein the additional support means is a panel between the inner walls of the process element.

8. The device of claim 6 wherein the additional support means is in the form of a cross between the inner walls of the process element.

9. The device of claim 6 wherein the additional support means is a tube positioned within the process element.

10. The device of claim 5 wherein the receptacle is enclosed and is connected to a gas source.

11. The device of claim 10 wherein the gas is $O_2$.

12. The device of claim 10 wherein the gas is inert.

13. The device of claim 5 wherein the ports are longitudinally spaced and helically located along the length of the receiving chamber.

14. The device of claim 5 including means for retaining the spiral process elements in position on the outer surface of the receiving chamber.

15. The device of claim 5 including means for discharging the treated fluid from the receiving chamber.

* * * * *